(12) United States Patent
Lee et al.

(10) Patent No.: US 11,692,890 B2
(45) Date of Patent: *Jul. 4, 2023

(54) TORQUE INDEX SENSOR AND STEERING DEVICE COMPRISING SAME

(71) Applicant: LG INNOTEK CO., LTD., Seoul (KR)

(72) Inventors: Chang Hwan Lee, Seoul (KR); Sung Wook Byun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 157 days.

This patent is subject to a terminal disclaimer.

(21) Appl. No.: 17/307,371

(22) Filed: May 4, 2021

(65) Prior Publication Data
US 2021/0262880 A1    Aug. 26, 2021

Related U.S. Application Data

(63) Continuation of application No. 16/348,068, filed as application No. PCT/KR2017/012572 on Nov. 8, 2017, now Pat. No. 11,022,510.

(30) Foreign Application Priority Data

Nov. 8, 2016  (KR) .................. 10-2016-0148097
Nov. 30, 2016 (KR) .................. 10-2016-0161711

(51) Int. Cl.
*G01L 5/00*       (2006.01)
*G01L 5/22*       (2006.01)
(Continued)

(52) U.S. Cl.
CPC ................ *G01L 5/221* (2013.01); *B62D 6/10* (2013.01); *G01D 5/145* (2013.01); *G01L 3/10* (2013.01); *G01L 3/104* (2013.01); *G01L 5/22* (2013.01)

(58) Field of Classification Search
CPC . G01L 5/221; G01L 3/10; G01L 3/104; G01L 5/22; B62D 6/10; G01D 5/145
See application file for complete search history.

(56) References Cited

U.S. PATENT DOCUMENTS 4,642,496 A   2/1987   Kerviel et al.
5,253,525 A   10/1993  Fukui et al.
(Continued)

FOREIGN PATENT DOCUMENTS

EP       2 860 504 A1      4/2015
KR    10-2009-0023739 A    3/2009
(Continued)

*Primary Examiner* — Max H Noori
(74) *Attorney, Agent, or Firm* — Birch, Stewart, Kolasch & Birch, LLP

(57) ABSTRACT

A torque index sensor including a substrate; a first cover which accommodates the circuit board; a first hall sensor and a second hall sensor which are disposed on the circuit board; a magnet seating member which is coupled to the stator; a second magnet which is coupled to the magnet seating member; and a second cover made of a metal material coupled with the first cover. Further, the magnet seating member and the second magnet are disposed between the first cover and the second cover, the second cover comprises: an upper plate on which a through hole is formed; and a side plate which extends in the rotational axis direction from the upper plate, and the side plate comprises a groove formed at a position corresponding to the hall sensor.

20 Claims, 25 Drawing Sheets

(51) Int. Cl.
    *B62D 6/10*     (2006.01)
    *G01D 5/14*     (2006.01)
    *G01L 3/10*     (2006.01)

(56) References Cited

U.S. PATENT DOCUMENTS

| | | |
|---|---|---|
| 5,521,495 A | 5/1996 | Takahashi et al. |
| 6,402,196 B1 | 6/2002 | Nicot |
| 9,321,172 B2 | 4/2016 | Johnson et al. |
| 11,022,510 B2 * | 6/2021 | Lee ............... G01D 5/145 |
| 2003/0106757 A1 | 6/2003 | Johnson et al. |
| 2007/0000455 A1 * | 1/2007 | Akiyama ............ G01D 5/145 |
| | | 123/19 |
| 2008/0007251 A1 | 1/2008 | Lee |
| 2011/0214515 A1 | 9/2011 | Kim et al. |
| 2013/0091960 A1 | 4/2013 | Lee |
| 2015/0090051 A1 | 4/2015 | Lee |
| 2015/0168140 A1 | 6/2015 | Elpermann et al. |
| 2016/0214648 A1 | 7/2016 | Schoepe et al. |
| 2018/0120182 A1 * | 5/2018 | Hur ............... G01L 3/104 |

FOREIGN PATENT DOCUMENTS

| | | |
|---|---|---|
| KR | 10-2010-0022334 A | 3/2010 |
| KR | 10-2010-0105015 A | 9/2010 |
| KR | 10-2012-0004031 A | 1/2012 |
| KR | 10-2015-0034982 A | 4/2015 |

\* cited by examiner

[Fig.1]
10
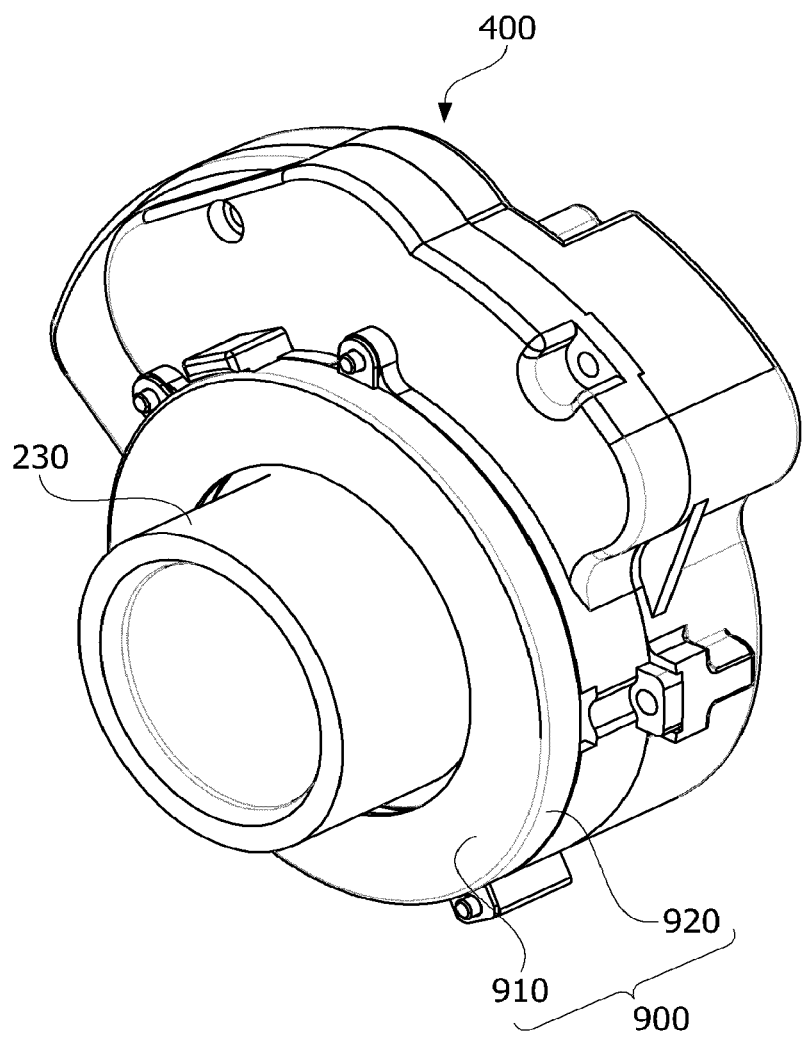

[Fig. 2]
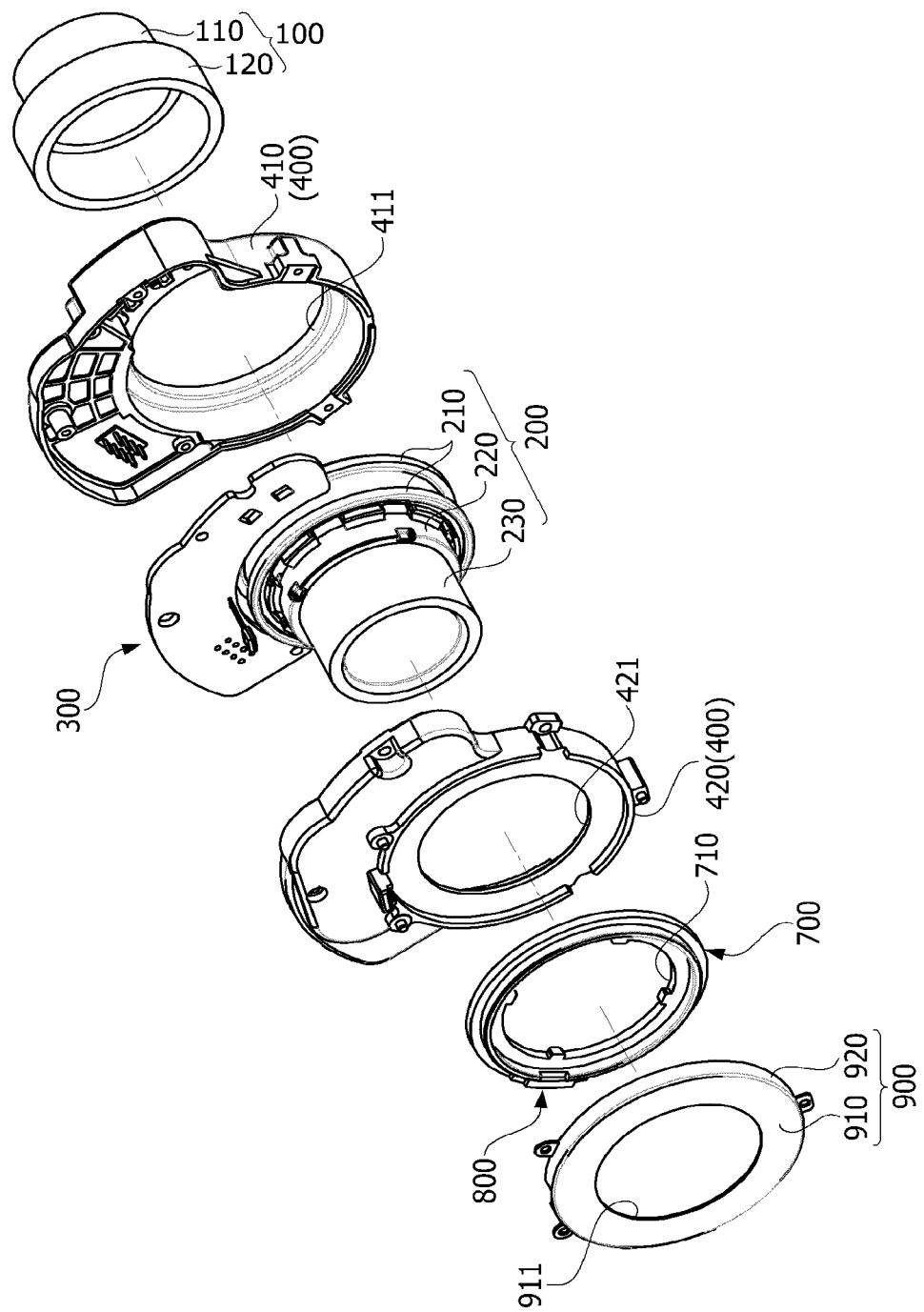

[Fig.3]
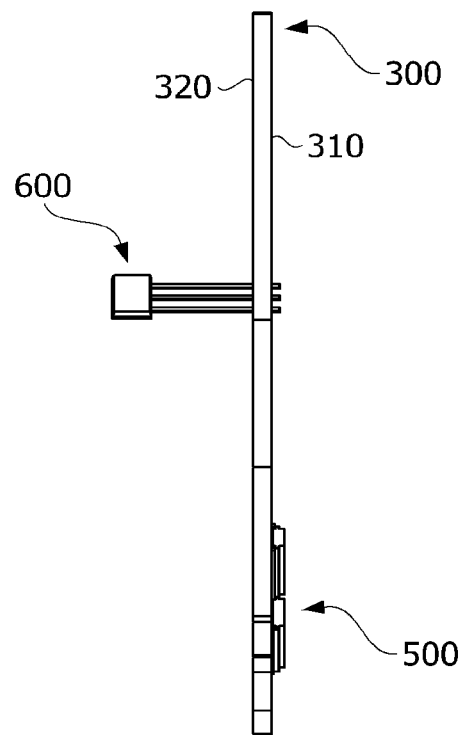

[Fig. 4]
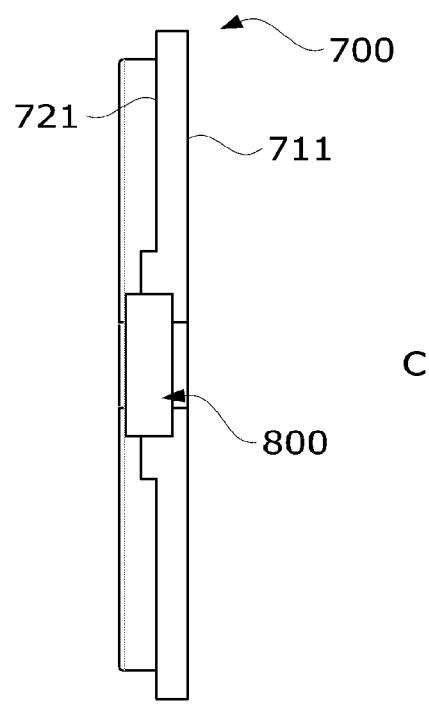

[Fig. 5]
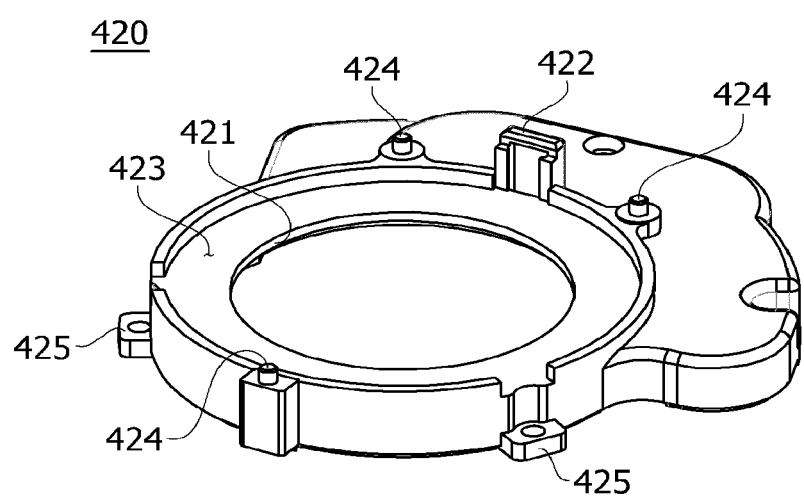

[Fig. 6]
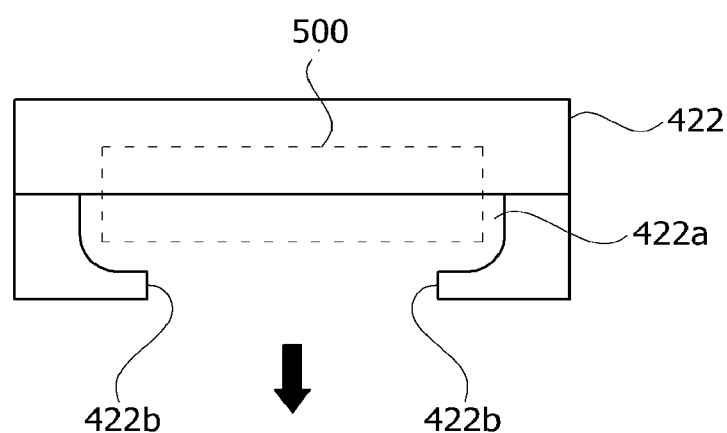

[Fig. 7]
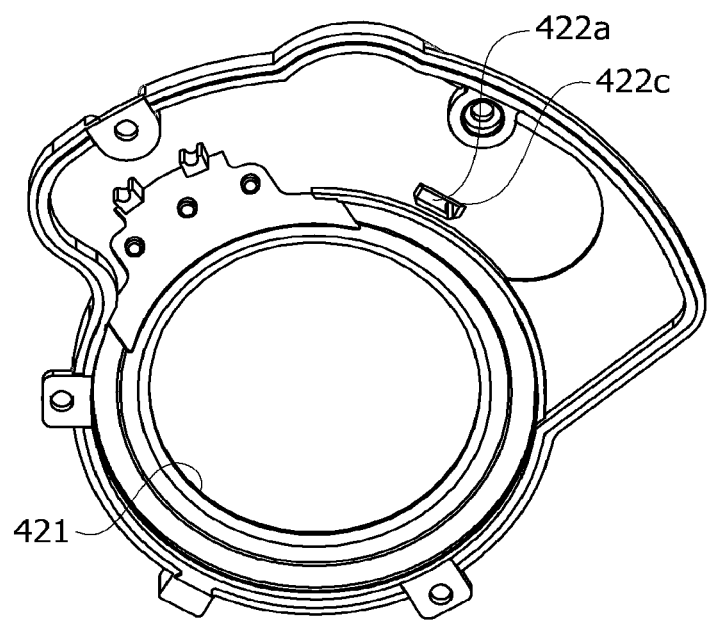

【Fig. 8】
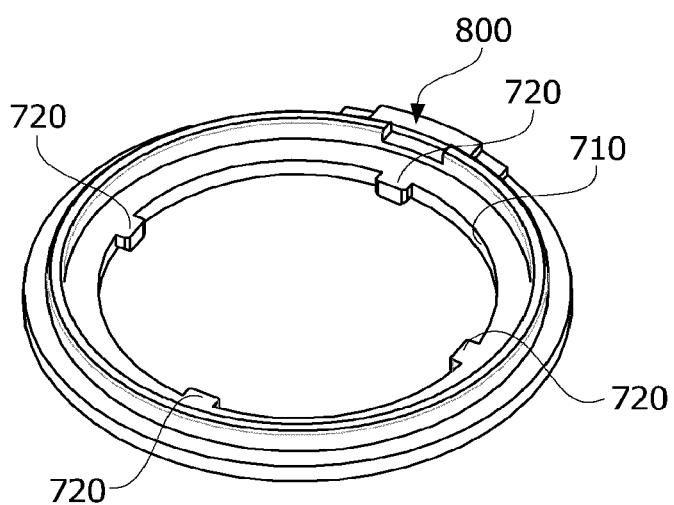

[Fig. 9]
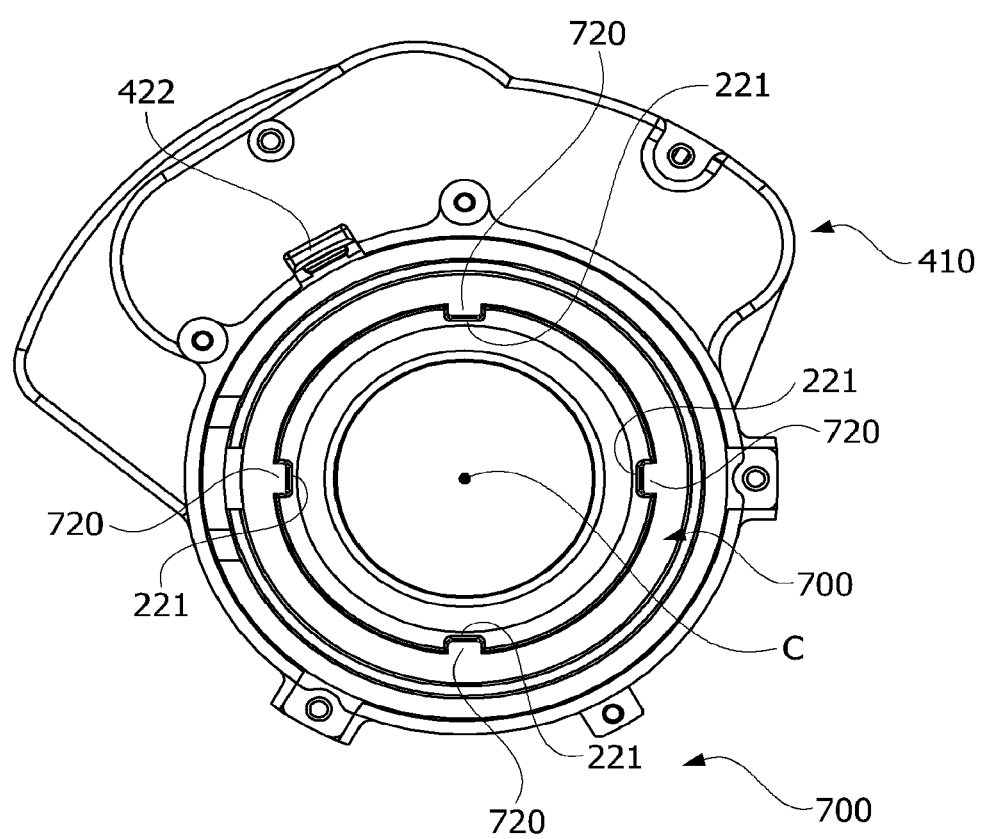

[Fig. 10]
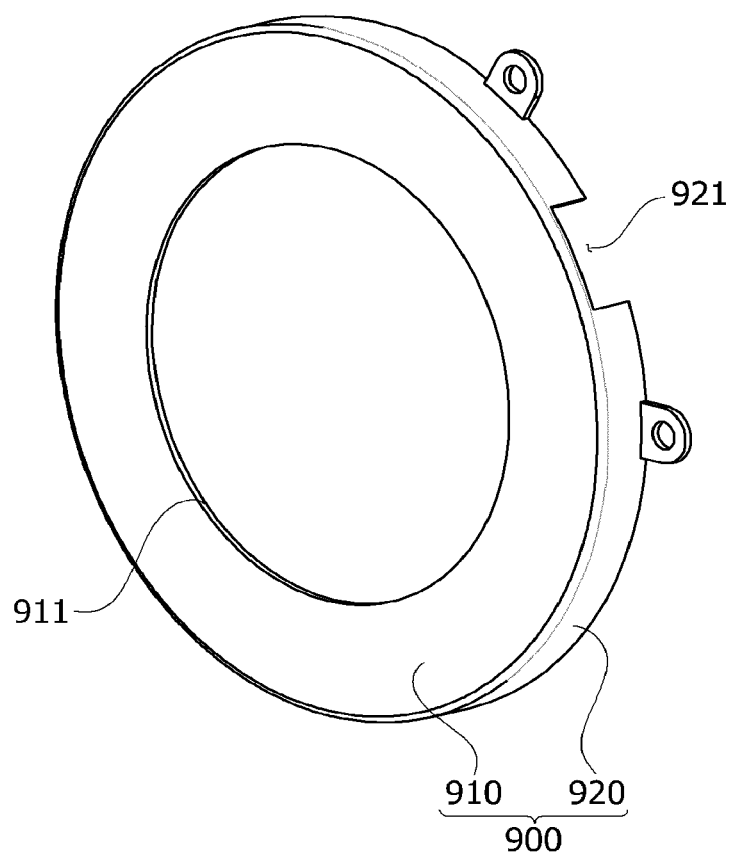

[Fig. 11]
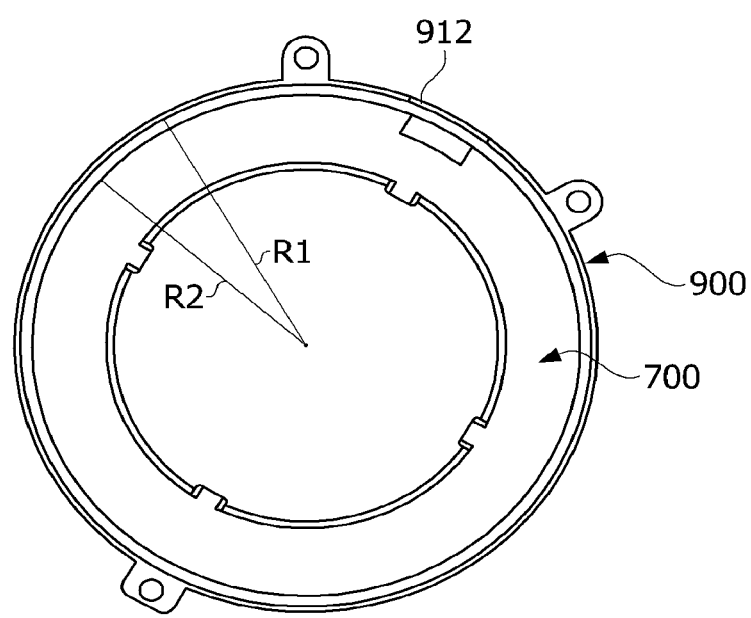

[Fig. 12]
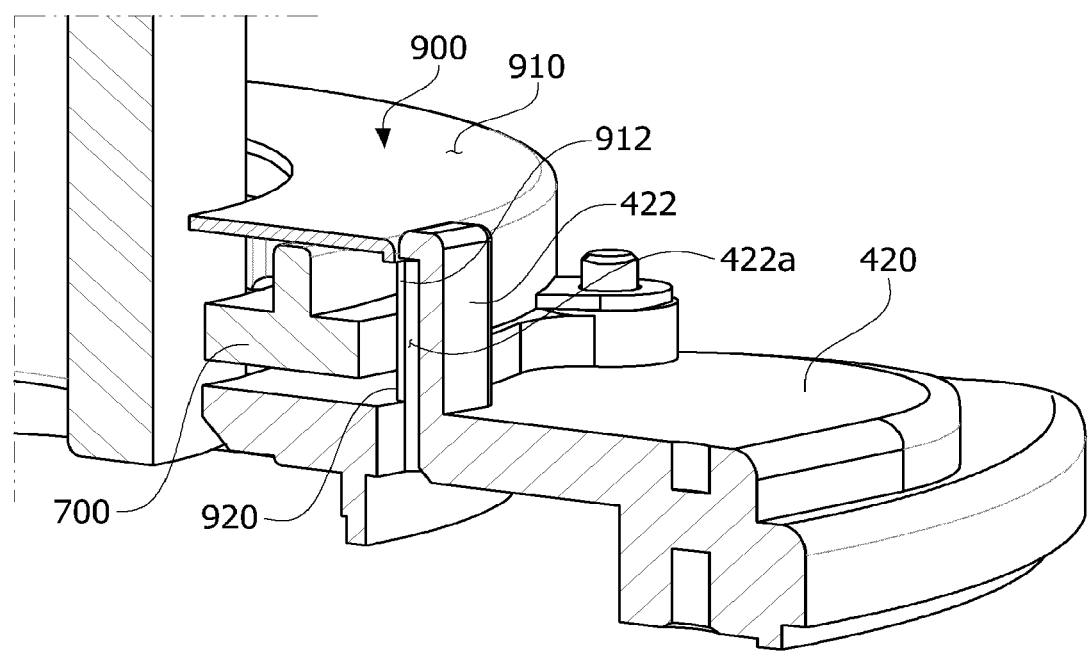

[Fig. 13]
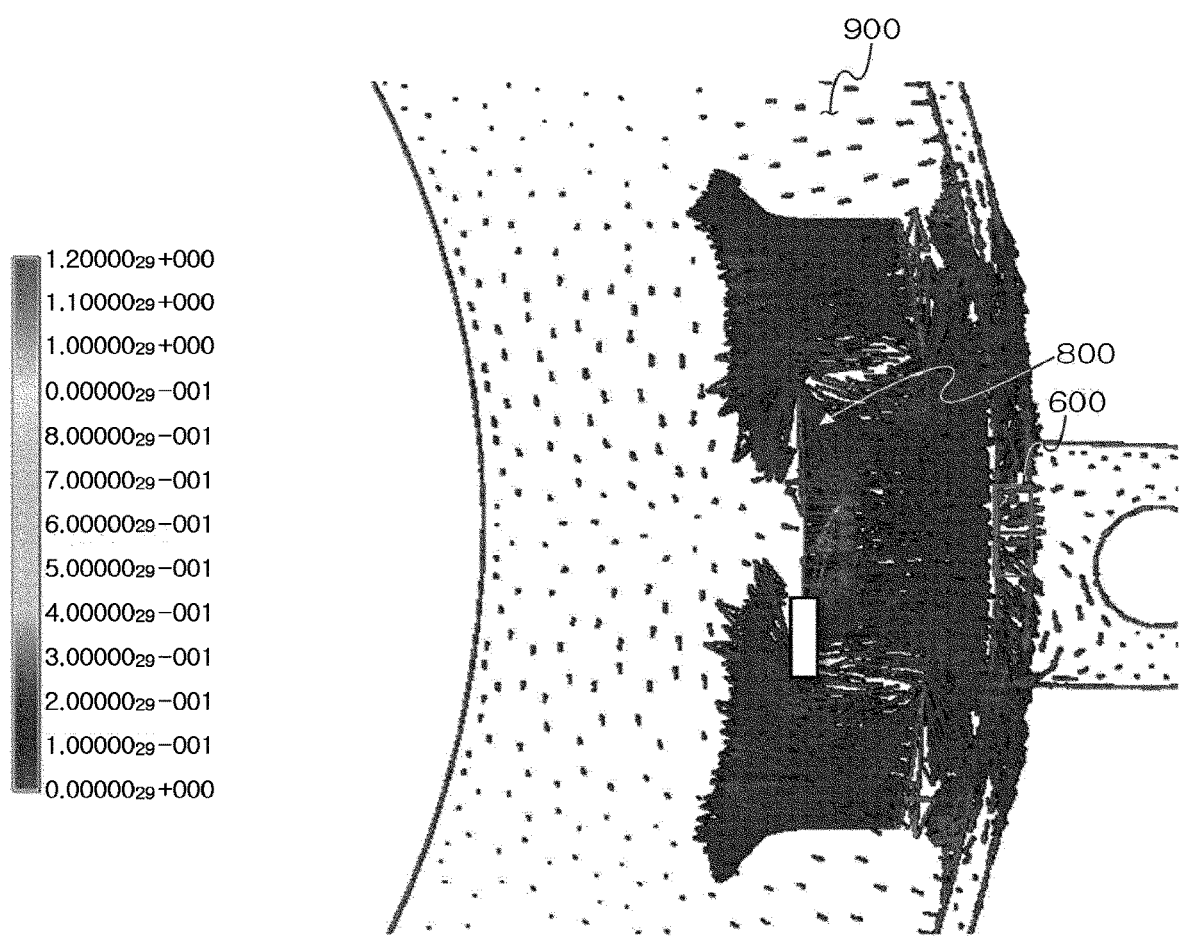

【Fig. 14】

| ANGLE(deg) | A<br>TORQUE OUTPUT<br>VARIATION AMOUNT | B<br>TORQUE OUTPUT<br>VARIATION AMOUNT | C<br>TORQUE OUTPUT<br>VARIATION AMOUNT |
|---|---|---|---|
| 0 | 0.023 | 0.005 | 0.006 |
| 10 | 0.006 | -0.003 | 0.001 |
| 20 | 0.011 | 0.009 | 0.000 |
| 30 | 0.008 | 0.003 | 0.006 |
| 40 | 0.019 | -0.047 | -0.003 |
| 50 | 0.017 | -0.042 | -0.001 |
| 60 | 0.007 | -0.053 | 0.010 |
| 70 | 0.012 | -0.065 | 0.010 |
| 80 | 0.016 | -0.089 | 0.012 |
| 90 | 0.023 | -0.088 | 0.007 |
| 100 | 0.014 | -0.085 | -0.001 |
| 110 | 0.011 | -0.077 | 0.005 |
| 120 | 0.011 | -0.048 | 0.008 |
| 130 | 0.021 | -0.046 | 0.009 |
| 140 | 0.016 | -0.037 | 0.003 |
| 150 | 0.017 | -0.019 | -0.001 |
| 160 | 0.015 | -0.002 | 0.018 |
| 170 | 0.007 | 0.006 | 0.001 |
| 180 | 0.016 | 0.016 | 0.012 |
|  |  |  |  |
| Max | 0.023 | 0.016 | 0.018 |
| Min | 0.006 | -0.089 | -0.003 |
| TORQUE OUTPUT<br>VARIATION AMOUNT<br>ANGLE(deg) | 0.017 | 0.105 | 0.021 |

[Fig. 15]
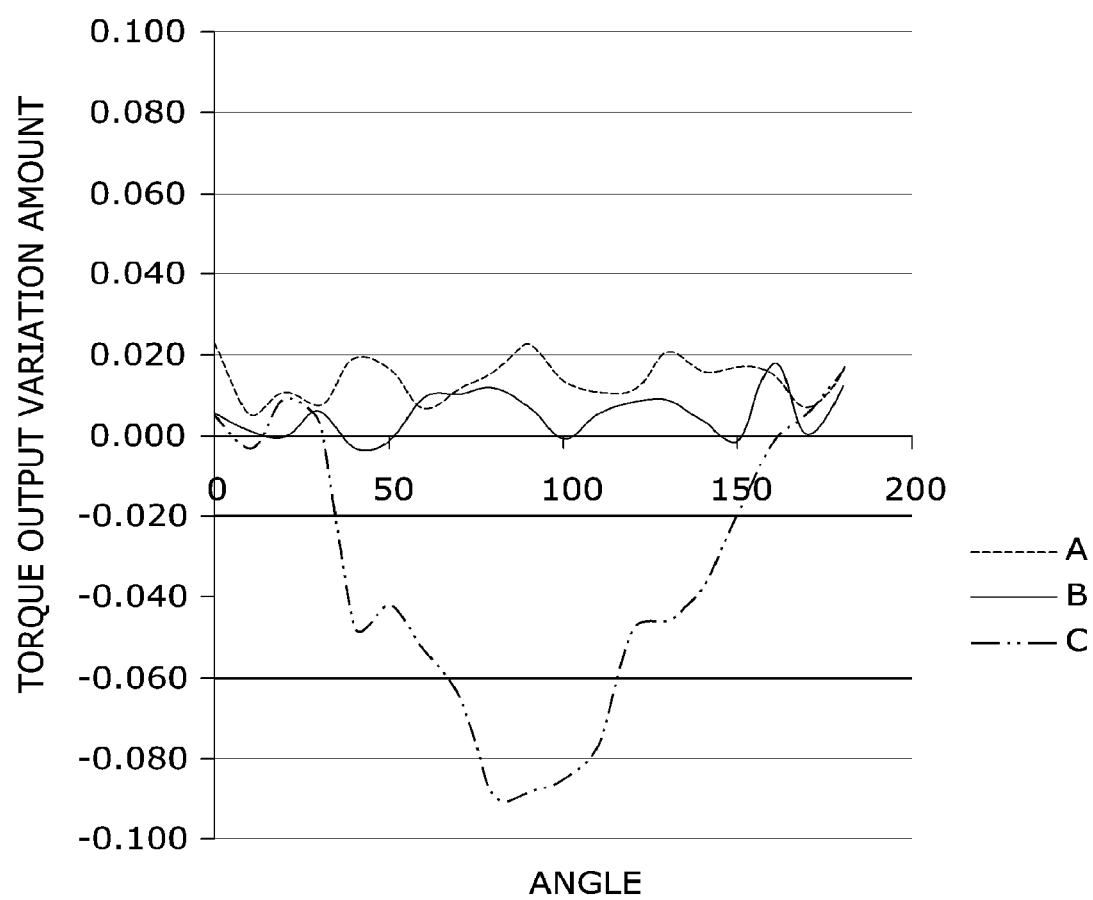

【Fig. 16】
20
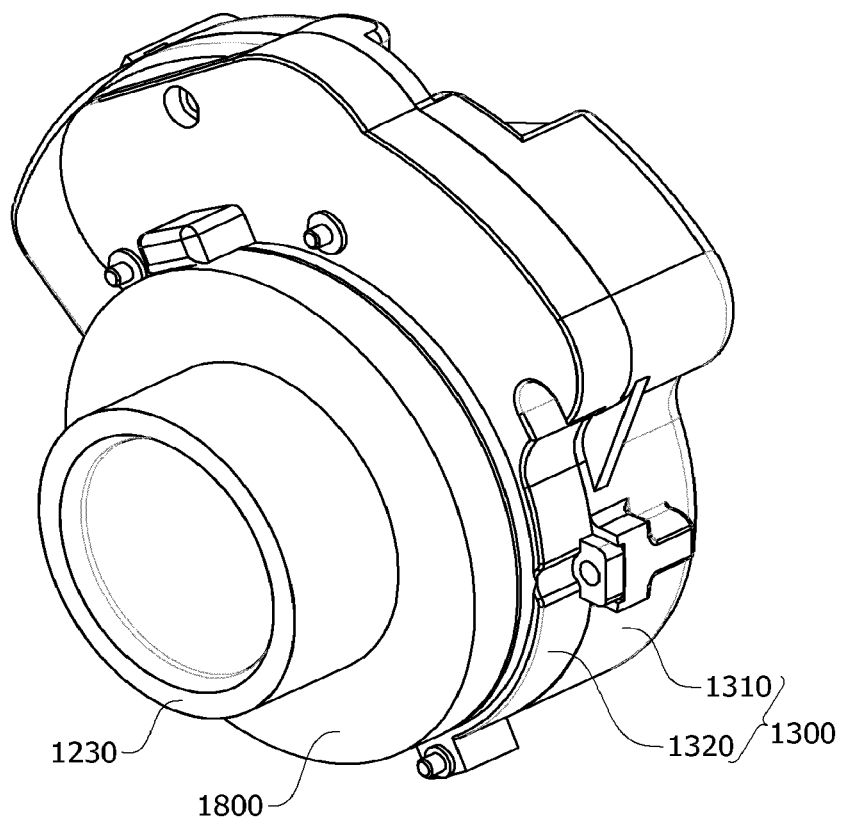

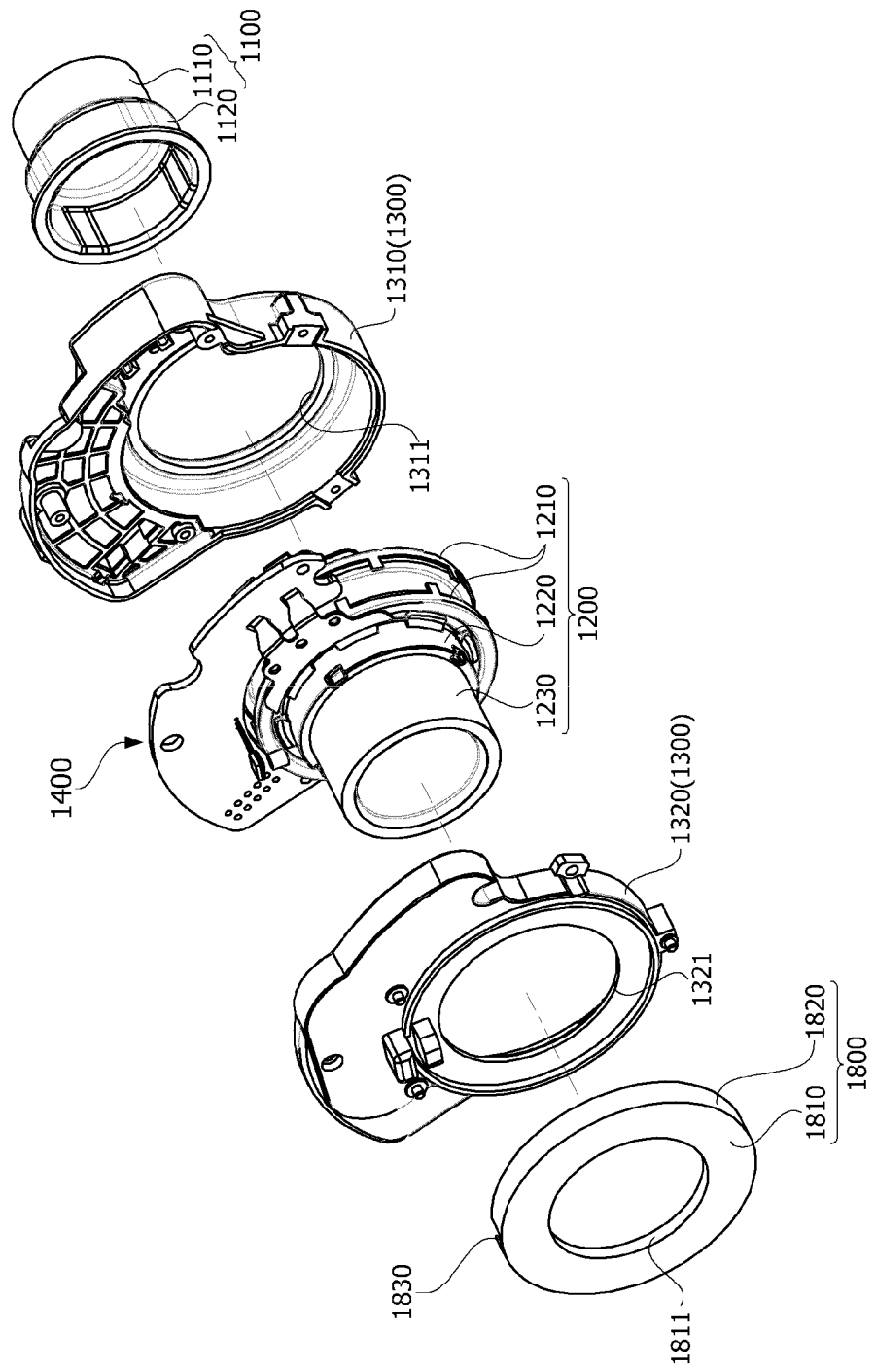
[Fig. 17]

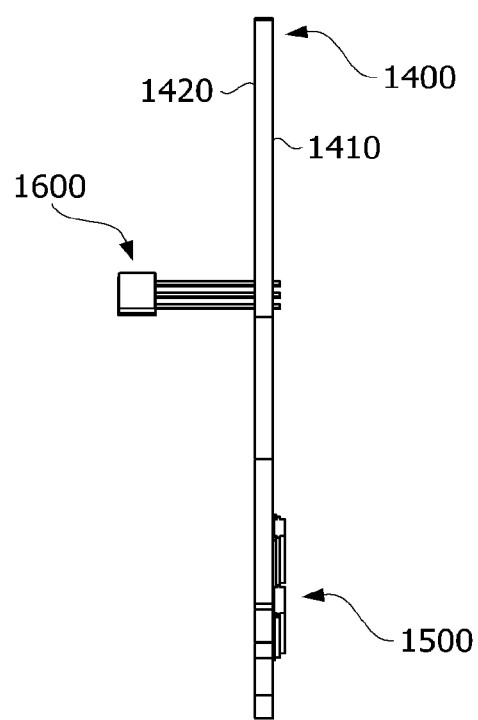
[Fig. 18]

【Fig. 19】
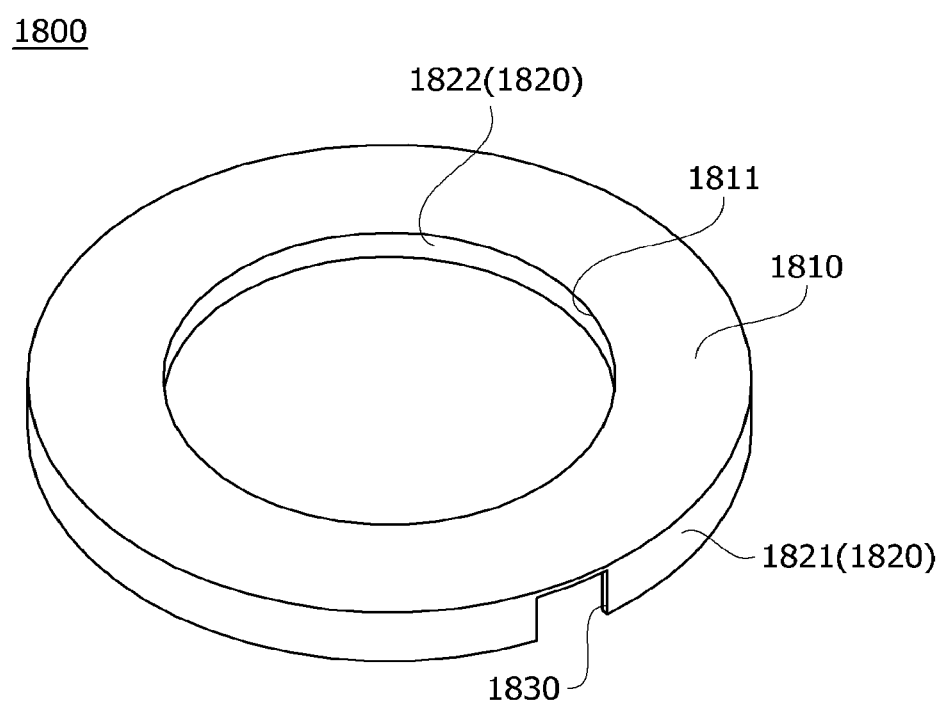

[Fig. 20]
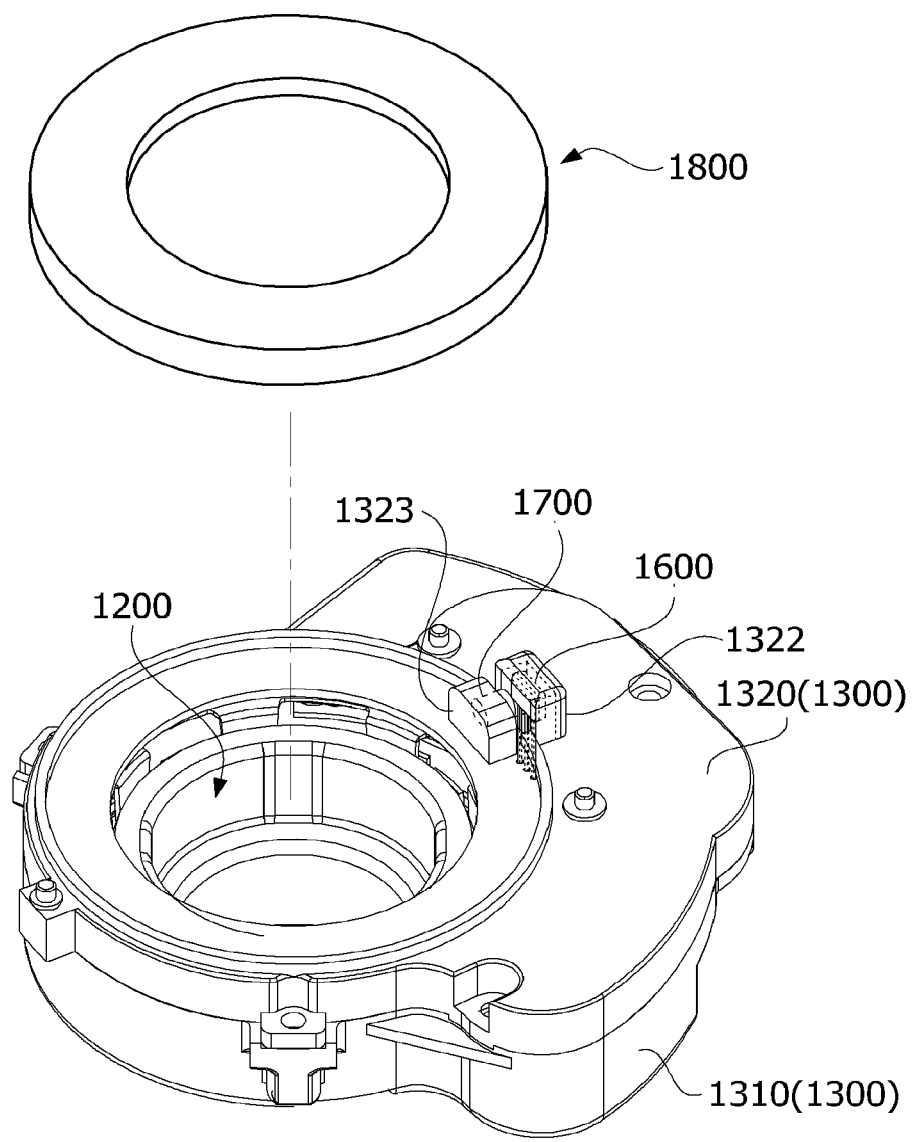

[Fig. 21]
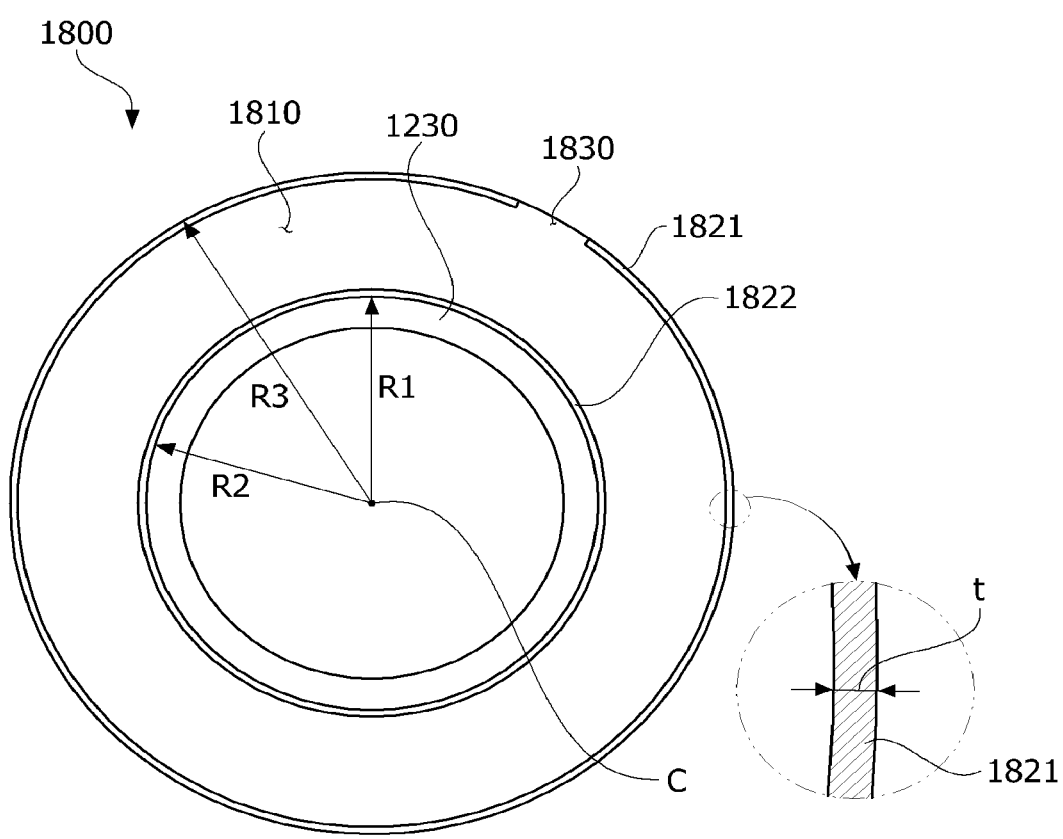

【Fig. 22】
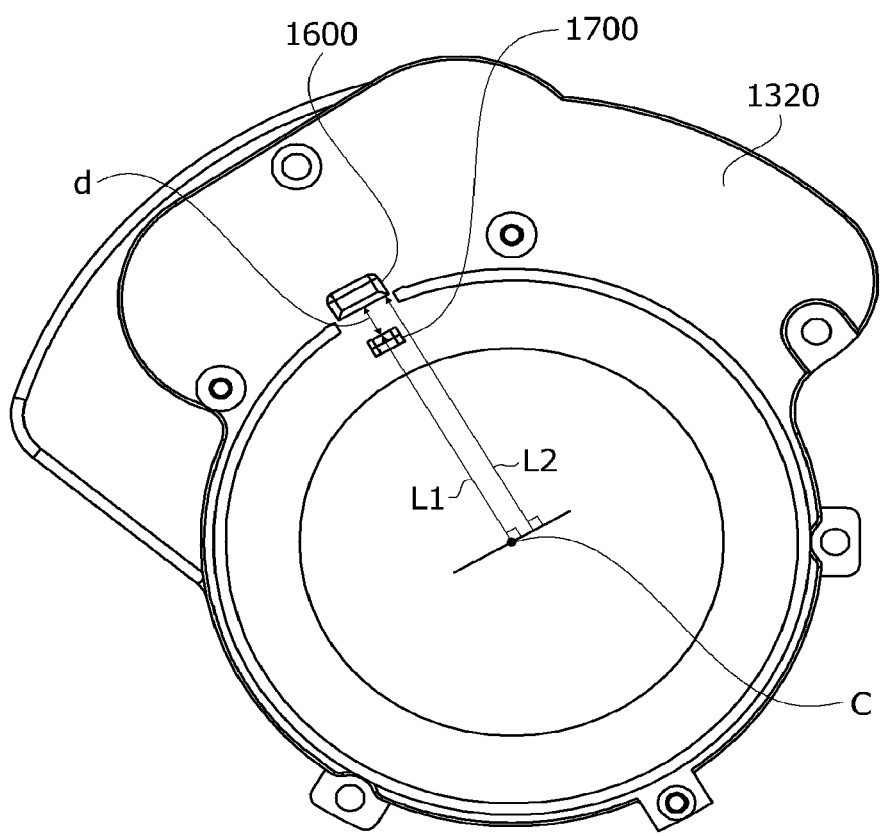

[Fig. 23]
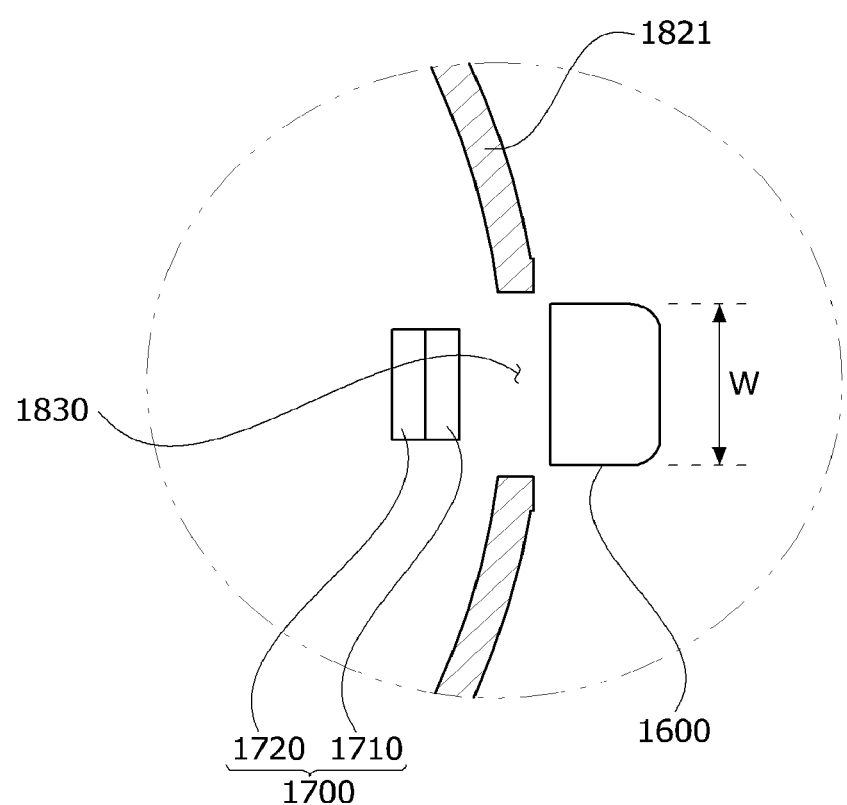

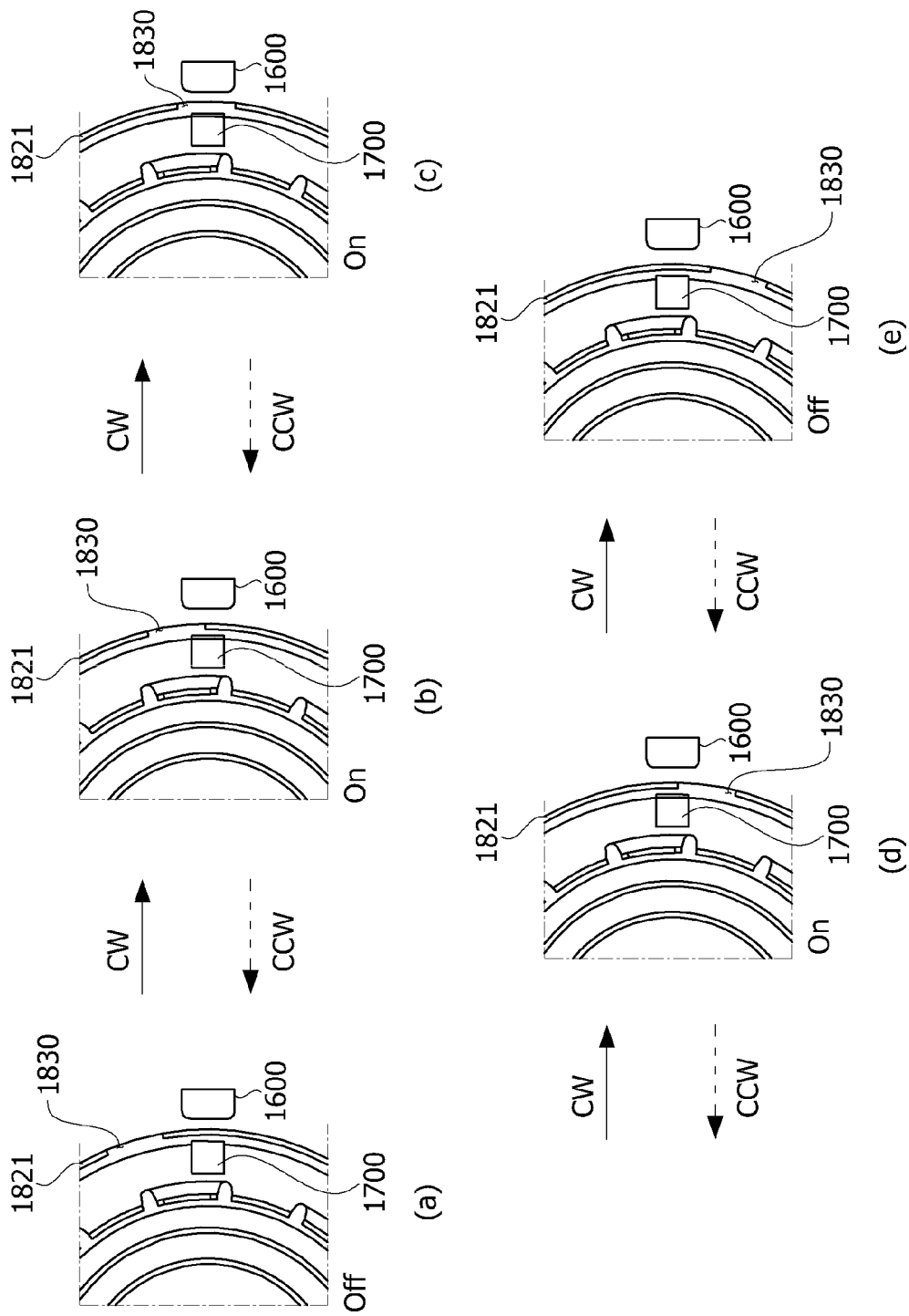
[Fig. 24]

[Fig. 25]
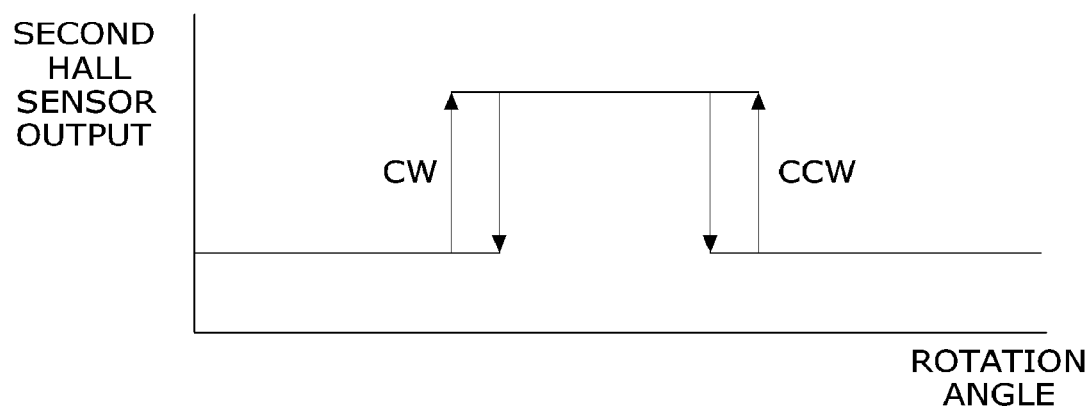

TORQUE INDEX SENSOR AND STEERING DEVICE COMPRISING SAME

CROSS-REFERENCE TO RELATED APPLICATIONS

This application is a Continuation of U.S. application Ser. No. 16/348,068, filed on May 7, 2019 (now U.S. Pat. No. 11,022,510 issued on Jun. 1, 2021), which is the National Phase under 35 U.S.C. § 371 of International Application No. PCT/KR2017/012572, filed on Nov. 8, 2017, which claims priority under 35 U.S.C. § 119(a) to Patent Application No. 10-2016-0148097, filed in the Republic of Korea on Nov. 8, 2016 and Patent Application No. 10-2016-0161711, filed in the Republic of Korea on Nov. 30, 2016, all of which are hereby expressly incorporated by reference into the present application.

TECHNICAL FIELD

An embodiment relates to a torque index sensor and a steering device including the same.

BACKGROUND ART

Since a power steering system (hereinafter, referred to as an electronic power system (EPS)) drives a motor in an electronic control unit according to a driving condition to ensure cornering stability and provide a quick restoring force, a driver can drive safely.

The EPS includes a torque index sensor configured to measure torque, a steering angle, and the like of a steering shaft to provide appropriate torque. The torque index sensor can be provided with a torque sensor configured to measure torque loaded to the steering shaft and an index sensor configured to measure angle acceleration of the steering shaft. The steering shaft can include an input shaft connected to a handle, an output shaft connected to a power transmission structure of the wheel side, and a torsion bar configured to connect the input shaft and the output shaft.

The torque sensor measures a torsion degree of the torsion bar to measure the torque loaded to the steering shaft. Further, the index sensor senses rotation of the output shaft to measure the angle acceleration of the steering shaft. In the torque index sensor, the torque sensor and the index sensor may be disposed together to be integrally configured.

However, in the torque index sensor, magnetic field interference occurs between the torque sensor and the index sensor. Accordingly, in order to prevent the magnetic field interference, a magnetic field shielding structure is separately provided between the torque sensor and the index sensor. Accordingly, when an overall thickness of the torque index sensor is decreased, a magnetic field shielding plate and a magnet become close to each other and thus a magnetic leakage occurs. Further, there is a limit in reducing the overall thickness of the torque index sensor due to an installation space of the magnetic field shielding structure. As a result, there is a problem that the magnetic field shielding structure becomes an important factor for increasing the overall thickness of the torque index sensor.

SUMMARY

The present invention is directed to providing a torque index sensor capable of preventing magnetic field interference and reducing a thickness thereof and a steering device including the same.

Problems desired to be solved by the present invention are not limited to the above-described problems, and purposes and effects understood from solutions and embodiments which will be described below are also included.

One aspect of the present invention provides a torque index sensor including a rotor having an outer circumferential surface on which a first magnet is disposed, a stator disposed at the outside of the rotor, a circuit board, a first cover configured to accommodate the circuit board, a first Hall sensor and a second Hall sensor mounted on the circuit board, a magnet seating member coupled to the stator, a second magnet coupled to the magnet seating member, and a second cover made of a metal material and coupled to the first cover, wherein the magnet seating member and the second magnet are disposed between the first cover and the second cover, the second cover includes an upper plate in which a through hole is formed and a side plate configured to extend in a rotational axis direction from the upper plate, and the side plate includes a groove formed at a location corresponding to the second Hall sensor.

The first Hall sensor may sense magnetic flux of the stator, and the second Hall sensor may sense magnetic flux of the second magnet.

The first cover may include a 1-1 cover and a 1-2 cover, the 1-1 cover may include a first hole through which the rotor passes, the 1-2 cover may include a second hole through which the stator passes, and the circuit board may be disposed between the 1-1 cover and the 1-2 cover.

The substrate includes a first surface facing the 1-1 cover and a second surface facing the 1-2 cover, the first Hall sensor may be disposed on the first surface, and the second Hall sensor may be disposed on the second surface.

The side plate may be disposed between the second magnet and the second Hall sensor on the basis of a direction perpendicular to an axial direction of the rotational axis.

The first cover may include a Hall sensor housing configured to protrude from an outer surface of the first cover and in which the second Hall sensor is located.

The Hall sensor housing may be provided with a slot configured to accommodate the second Hall sensor, and the slot may have an open surface.

The slot may include a stopper configured to protrude from an inlet of the open surface.

The first cover may include an accommodation part disposed on an outer surface thereof and concavely disposed along a circumference of the first hole through which the stator passes so that the magnet seating member is seated.

The magnet seating member may include a first surface facing the second cover and a second surface facing the first cover, and the second magnet may be disposed on the first surface.

The magnet seating member may include a first coupling part coupled to the stator in the direction perpendicular to the axial direction of the rotational axis.

The stator may include two stator rings and a molding member configured to fix the two stator rings, and the molding member may include a second coupling part coupled to the first coupling part.

The first coupling part may be at least one protrusion configured to protrude from an inner circumferential surface of the magnet seating member, and the second coupling part may be a groove disposed in an outer circumferential surface of the stator holder and into which the first coupling part is inserted.

The first cover may include a Hall sensor housing configured to protrude from an outer surface of the first cover and in which the second Hall sensor is located, and the groove of the side plate of the second cover and the Hall sensor housing may be aligned on the basis of a rotating direction of the rotational axis.

An inner diameter of the side plate of the second cover may be greater than an outer diameter of the magnet seating member.

The second cover may include a hole through which the stator passes.

The second cover may include a third coupling part, and the first cover may include a fourth coupling part coupled to the third coupling part.

The third coupling part may be an engaging flange configured to protrude from the side plate and including an engaging hole, and the fourth coupling part may be an engaging protrusion configured to protrude from the first cover and inserted into the engaging hole.

Another aspect of the present invention provides a steering device including a steering shaft and a torque index sensor coupled to the steering shaft, wherein the torque index sensor includes a rotor having an outer circumferential surface on which a first magnet is disposed, a stator disposed at the outside of the rotor, a circuit board, a first cover configured to accommodate the circuit board, a first Hall sensor and a second Hall sensor mounted on the circuit board, a magnet seating member coupled to the stator, a second magnet coupled to the magnet seating member, and a second cover made of a metal material and coupled to the first cover, wherein the magnet seating member and the second magnet are disposed between the first cover and the second cover, the second cover includes an upper plate in which a through hole is formed and a side plate configured to extend in a rotational axis direction from the upper plate, and the side plate includes a groove formed at a location corresponding to the second Hall sensor.

Still another aspect of the present invention provides a torque index sensor including a rotor having an outer circumferential surface on which a first magnet is disposed, a stator disposed at the outside of the rotor, a cover including a hole through which the stator passes, a circuit board disposed at one side of the cover, a first Hall sensor and a second Hall sensor mounted on the circuit board, a second magnet and a magnet shield disposed at the other side of the cover, wherein the stator includes a holder coupled to a rotational axis, the magnet shield is coupled to the holder, the magnet shield includes an upper plate and a side plate configured to extend from the upper plate, an inner diameter of the upper plate is the same as an outer diameter of the holder, an outer diameter of the upper plate is greater than a distance from a center of the holder to the second magnet and less than a distance from the center of the holder to the second Hall sensor, and the side plate has a groove formed in a size corresponding to a width of the second Hall sensor.

The first Hall sensor may sense magnetic flux of the stator, and the second Hall sensor may sense magnetic flux of the second magnet.

The second Hall sensor and the second magnet may be disposed to face the side plate.

The second Hall sensor and the second magnet may be disposed to be aligned on the basis of a circumferential direction of the magnet shield.

The first Hall sensor and the second magnet may be disposed to face each other.

The second magnet may include a first pole and a second pole, the first pole may be disposed relatively inward from the second magnet, and the second pole may be disposed outward from the second magnet on the basis of a radial direction of the magnet shield.

The second pole may be an N-pole.

The side plate of the magnet shield may include an outer side plate configured to extend from an outer circumferential surface of the upper plate and an inner side plate configured to extend from an inner circumferential surface of the upper plate.

A thickness of the outer side plate may be less than a spacing distance between the second Hall sensor and the second magnet.

The magnet shield may be press-fitted into the holder.

The magnet shield may be formed of a ferromagnetic material.

On the basis of a radial direction of the magnet shield, the second magnet may be disposed in the side plate and the second Hall sensor may be disposed at the outside of the side plate.

The torque index sensor may include a first cover including a first hole through which the rotor passes and a second cover including a second hole through which the stator passes.

The second cover may include a Hall sensor housing configured to protrude from an outer surface thereof and in which the second Hall sensor is located.

The second cover may include a magnet housing configured to protrude from an outer surface thereof to fix the second magnet.

Yet another aspect of the present invention provides a steering device including a steering shaft and a torque index sensor coupled to the steering shaft, wherein the torque index sensor includes a rotor having an outer circumferential surface on which a first magnet is disposed, a stator disposed at the outside of the rotor, a cover including a hole through which the stator passes, a circuit board disposed at one side of the cover, a first Hall sensor and a second Hall sensor mounted on the circuit board, and a second magnet and a magnet shield disposed at the other side of the cover, wherein the stator includes a holder coupled to a rotational axis, the magnet shield is coupled to the holder, the magnet shield includes an upper plate and a side plate configured to extend from the upper plate, an inner diameter of the upper plate is the same as an outer diameter of the holder, an outer diameter of the upper plate is greater than a distance from a center of the holder to the second magnet and less than a distance from the center of the holder to the second Hall sensor, and the side plate has a groove formed in a size corresponding to a width of the second Hall sensor.

According to an embodiment, a magnetic field interference can be prevented by using a metal cover, thereby providing a favorable effect of reducing an overall thickness of a torque index sensor.

According to the embodiment, since a magnet seating member and a stator are coupled to each other in a direction perpendicular to an axial direction of a rotational axis, the thickness of the torque index sensor can be decreased further.

According to the embodiment, since signals are detected by fixing a second magnet and rotating a magnet shield, the magnetic field interference can be prevented and the overall thickness of the torque index sensor can be decreased.

According to the embodiment, since a magnet shield is directly press-fitted into a holder and fixed to the holder, the magnet shield can be used as a cover without installing a separate cover.

BRIEF DESCRIPTION OF THE DRAWINGS

FIG. 1 is a view illustrating a torque index sensor according to an embodiment.

FIG. 2 is an exploded view of the torque index sensor shown in FIG. 1.

FIG. 3 is a side view of a circuit board shown in FIG. 2.

FIG. 4 is a side view of a magnet seating member shown in FIG. 2.

FIG. 5 is a view illustrating a 1-2 cover in FIG. 2.

FIG. 6 is a view illustrating a Hall sensor housing of the 1-2 cover.

FIG. 7 is a bottom view of the 1-2 cover.

FIG. 8 is a view illustrating a magnet seating member.

FIG. 9 is a view illustrating a coupling state between a molding member of a stator and the magnet seating member.

FIG. 10 is a view illustrating a second cover.

FIG. 11 is a view illustrating the magnet seating member included in the second cover.

FIG. 12 is a view illustrating a side plate disposed between a second magnet and a second Hall sensor.

FIG. 13 is a graph illustrating flux due to the second cover.

FIG. 14 is a table in which torque output variation amounts are compared.

FIG. 15 is a graph illustrating the torque output variation amounts.

FIG. 16 is a view illustrating a torque index sensor according to a second embodiment.

FIG. 17 is an exploded view of the torque index sensor shown in FIG. 16.

FIG. 18 is a side view of a circuit board shown in FIG. 17.

FIG. 19 is a view illustrating a magnet shield shown in FIG. 17.

FIG. 20 is a view illustrating a location of each of the magnet shield and a second cover.

FIG. 21 is a view illustrating a bottom surface of the magnet shield.

FIG. 22 is a view illustrating a second magnet and a second Hall sensor on the basis of the second cover.

FIG. 23 is a view illustrating the second magnet and the second Hall sensor disposed to face each other.

FIG. 24 is a view illustrating a location of each of a rotating magnet shield and a groove.

FIG. 25 is a view illustrating an output of the second Hall sensor.

MODES OF THE INVENTION

Hereinafter, embodiments of the present invention will be described in detail with reference to the accompanying drawings. Purposes, particular advantages, and new characteristic of the present invention may become more apparent from the following detailed description related to the accompanying drawings and the embodiment. Further, terms and words used in the specification and the claims should not interpreted with an ordinary or dictionary definition and should be interpreted with a meaning and concept which coincide with a technical spirit of the present invention on the basis of a principle in which an inventor may appropriately define the concepts of the terms to describe the invention thereof in an optimal method. In addition, while describing the present invention, a detailed description for a related technology which may unnecessarily obscure the spirit of the present invention will be omitted.

Further, it should be understood that, although the terms "second," "first," and the like may be used herein to describe various elements, the elements are not limited by the terms. The terms are only used to distinguish one element from another. For example, a first element could be termed a second element, and similarly, a second element could be termed a first element without departing from the scope of the present invention. The term "and/or" includes combinations of one or all of a plurality of associated listed items.

FIG. 1 is a view illustrating a torque index sensor according to a first embodiment, and FIG. 2 is an exploded view of the torque index sensor shown in FIG. 1.

Referring to FIGS. 1 and 2, a torque index sensor 10 may include a rotor 100, a stator 200, a circuit board 300, a first cover 400, a first Hall sensor 500, a second Hall sensor 600, a magnet seating member 700, a second magnet 800, and a second cover 900.

The rotor 100 is disposed in the stator 200. The rotor 100 is connected to an input shaft of a steering shaft. Here, the input shaft may be a steering shaft connected to a handle of a vehicle. The rotor 100 may include a cylindrical-shaped yoke 110 and a first magnet 120 disposed on the yoke 110. The input shaft is inserted into the yoke 110. Further, the first magnet 120 may be disposed at the outside of the yoke 110. The first magnet 120 may be fixed to an outer circumferential surface of the yoke 110 by adhesion or press-fitting.

The stator 200 is disposed at the outside of the rotor 100. The stator 200 may include stator rings 210, a molding member 220, and a holder 230. A pair of stator rings 210 may be disposed to be spaced apart from and opposite to each other. Further, two stator rings 210 may be fixed to an upper side and a lower side of the molding member 220, respectively. The holder 230 is coupled to the molding member 220. The holder 230 may be connected to an output shaft of the steering shaft. Here, the output shaft may be a steering shaft connected to a power transmission structure of the wheel side. Accordingly, the stator 200 is connected to the output shaft and rotates together with the output shaft.

Meanwhile, the stator 200 may be disposed adjacent to the stator rings 210 and provided with a collector configured to collect a magnetization amount of the stator 200.

FIG. 3 is a side view of a circuit board shown in FIG. 2.

As shown in FIGS. 2 and 3, the first Hall sensor 500 and the second Hall sensor 600 are disposed on the circuit board 300.

The first cover 400 may include a 1-1 cover 410 and a 1-2 cover 420. The 1-1 cover 410 and the 1-2 cover 420 may be disposed to face each other and each have a space to accommodate the stator 200 therein. The circuit board 300 is disposed between the 1-1 cover 410 and the 1-2 cover 420. The 1-1 cover 410 may include a first hole 411 through which the rotor 100 passes. Further, the 1-2 cover 420 may include a second hole 421 through which the stator 200 passes.

Referring to FIG. 3, the circuit board 300 may include a first surface 310 facing the 1-1 cover 410 and a second surface 320 facing the 1-2 cover 420. The first Hall sensor 500 may be disposed on the first surface 310. The second Hall sensor 600 may be disposed on the second surface 320.

The first Hall sensor 500 detects the magnetization amount of the stator 200 generated by an electric interaction between the first magnet 120 of the rotor 100 and the stator 200. The first Hall sensor 500 may be disposed on the circuit board 300. Specifically, the first Hall sensor 500 is disposed between two collectors to detect the magnetization amount magnetized by an interaction between the stator rings 210 and the first magnet 120.

The rotor 100, the stator 200, and the first Hall sensor 500 are configurations for measuring torque. Torsion occurs in a torsion bar between the input shaft and the output shaft due to a difference in the rotation amount between the input shaft and the output shaft. When the torsion occurs, a rotation amount of the first magnet 120 of the rotor 100 becomes different from a rotation amount of the stator 200. Accordingly, since a facing surface of the first magnet 120 becomes different from facing surfaces of the stator rings 210, the magnetization amount varies. The first Hall sensor 500 may detect variation of the magnetization amount to measure torque loaded to the steering shaft.

The second Hall sensor 600 may output a detection signal with a period of 360° to calculate angle acceleration of the output shaft every time the second Hall sensor 600 is adjacent to the second magnet 800 disposed on the magnet seating member 700.

The magnet seating member 700 is provided with a ring-shaped hole 710 through which the stator 200 passes.

FIG. 4 is a side view of the magnet seating member shown in FIG. 2.

Referring to FIG. 4, on the basis of an axial direction C of a rotational axis, the magnet seating member 700 may include a first surface 711 facing the first cover 400 and a second surface 721 facing the second cover 900. The second magnet 800 may be disposed on the second surface 721 to face the second cover 900. The magnet seating member 700 may be coupled to the holder 230 of the stator 200 to rotate together with the output shaft when the output shaft rotates.

The second magnet 800 is disposed on the magnet seating member 700. The second magnet 800 may be insertion-molded or adhesively fixed to the magnet seating member 700. The second magnet 800 rotates together with the magnet seating member 700 when the output shaft rotates. Accordingly, as the output shaft rotates, the second magnet 800 repeats a state of approaching and moving away from the second Hall sensor 600.

The second cover 900 covers the magnet seating member 700. The second cover 900 is coupled to the first cover 400. The second cover 900 is made of a metal material to guide flux generated from the second magnet 800 to the second cover 900. Since a flow of the flux generated from the second magnet 800 to the first magnet 120 is limited by the second cover 900, a separate shielding plate is not necessary to be installed to prevent a magnetic field interference in the torque index sensor according to the embodiment.

FIG. 5 is a view illustrating the 1-2 cover in FIG. 2, FIG. 6 is a view illustrating a Hall sensor housing of the 1-2 cover, and FIG. 7 is a bottom view of the 1-2 cover.

Referring to FIGS. 5 and 6, the 1-2 cover 420 may include a Hall sensor housing 422 and an accommodation part 423.

The Hall sensor housing 422 protrudes from an outer surface of the 1-2 cover 420. The Hall sensor housing 422 is disposed adjacent to the accommodation part 423. The second Hall sensor 600 is located in the Hall sensor housing 422. The Hall sensor housing 422 serves to fix a location of the second Hall sensor 600. The Hall sensor housing 422 is provided with a slot 422a configured to accommodate the second Hall sensor 600 therein and has an open surface which is open toward the accommodation part 423. Further, a stopper 422b configured to restrict the second Hall sensor 600 to prevent separation of the second Hall sensor 600 through the open surface may protrude from an inlet of the open surface of the Hall sensor housing 422. As shown in FIG. 7, the second Hall sensor 600 may be disposed in the slot 422a through an inlet 422c disposed in a bottom surface of the 1-2 cover 420.

The accommodation part 423 may be disposed near the second hole 421 in a concave shape from the outer surface of the 1-2 cover 420. The accommodation part 423 is a place where the magnet seating member 700 is accommodated.

Meanwhile, the 1-2 cover 420 may include a fourth coupling part 424. The fourth coupling part 424 is coupled to the second cover 900. A plurality of fourth coupling parts 424 may be disposed along an edge of the accommodation part 423. The fourth coupling parts 424 may be engaging protrusions. Further, the 1-2 cover 420 may be provided with an engaging part 425 on an edge thereof to be coupled to the 1-1 cover 410.

FIG. 8 is a view illustrating the magnet seating member, and FIG. 9 is a view illustrating a coupling state between the molding member of the stator and the magnet seating member.

Referring to FIGS. 8 and 9, the magnet seating member 700 may include a first coupling part 720 configured to protrude from an inner circumferential surface thereof. When the magnet seating member 700 is coupled to the molding member 220 of the stator 200, the first coupling part 720 may be coupled to the molding member 220 in the direction perpendicular to the axial direction of the rotational axis. In this case, a second coupling part 221 coupled to the first coupling part 720 may be disposed on an outer circumferential surface of the molding member 220. The first coupling part 720 may be a plurality of protruding protrusions and the second coupling part 221 may be a plurality of grooves into which the first coupling parts 720 are inserted.

When the magnet seating member 700 is coupled to the molding member 220 of the stator 200, since the first coupling part 720 and the second coupling part 221 are coupled to each other in the direction perpendicular to the axial direction of the rotational axis, an overall thickness of the torque index sensor may be decreased. In other words, when the first coupling part 720 and the second coupling part 221 are coupled to each other in the axial direction of the rotational axis, a coupling space in the rotational axis direction is necessary and the coupling space causes an increase of the overall thickness of the torque index sensor. However, since the magnet seating member 700 of the torque index sensor according to the embodiment and the molding member 220 of the stator 200 are coupled to each other in the direction perpendicular to the axial direction of the rotational axis, the coupling space disposed in the rotational axis direction may be excluded.

FIG. 10 is a view illustrating the second cover, and FIG. 11 is a view illustrating the magnet seating member included in the second cover.

Referring to FIGS. 10 and 11, the second cover 900 may include an upper plate 910 and a side plate 920. The upper plate 910 has a disk shape, and a through hole 911 through which the holder 230 of the stator 200 passes is disposed in a center of the upper plate 910. The side plate 920 is disposed along an edge of the upper plate 910 and is bent downward from the upper plate 910. When the second cover 900 is coupled to the first cover 400, the side plate 920 has a shape bent and configured to extend from the upper plate 910 in the rotational axis direction. As shown in FIG. 10, an inner diameter R1 of the side plate 920 may be designed to be at least greater than an outer diameter R2 of the magnet seating member 700. Accordingly, the side plate 920 may be disposed between the magnet seating member 700 and the Hall sensor housing 422 on the basis of the direction perpendicular to the rotational axis direction.

Meanwhile, a third coupling part 922 may be disposed on an edge of the side plate 920. The third coupling part 922 is coupled to the fourth coupling part 424 of the 1-2 cover 420 to couple the second cover 900 and the first cover 400. The third coupling part 922 may be an engaging flange configured to protrude from the side plate 920 and including an engaging hole. A plurality of third coupling parts 922 may be disposed. Further, some of the plurality of third coupling parts 922 may be disposed adjacent to a groove 921.

FIG. 12 is a view illustrating the side plate disposed between the second magnet and the second Hall sensor.

Referring to FIGS. 2 and 12, the side plate 920 may be disposed between the magnet seating member 700 and the Hall sensor housing 422. Accordingly, the side plate 920 covers a side surface of the second magnet 800 disposed on the magnet seating member 700. Further, the side plate 920 may include the groove 921. The groove 921 is formed by an incision of a part of the side plate 920 and is a structure in which the inside and the outside of the side plate 920 communicate with each other. The groove 921 is aligned with the second Hall sensor 600. Specifically, when the second cover 900 is coupled to the first cover 400, the groove 921 is aligned with the Hall sensor housing 112 in a rotating direction of the rotational axis. That is, the side plate 920 covers the side surface of the second magnet 800 to cover a space between the second magnet 800 and the second Hall sensor 600 so that the second magnet 800 and the second Hall sensor 600 face each other through the groove 921.

When the output shaft rotates, the second magnet 800 also rotates. As the second magnet 800 rotates, the second magnet 800 periodically approaches or moves away from the second Hall sensor 600. Accordingly, the second Hall sensor 600 may generate a detection signal with a period of 360°.

FIG. 13 is a graph illustrating flux due to the second cover.

Referring to FIG. 13, in a state in which a shielding structure does not exist between the first magnet 120 and the second magnet 800, it can be confirmed that the flux generated by rotation of the second magnet 800 is guided through the second cover 900.

FIG. 14 is a table in which torque output variation amounts are compared, and FIG. 15 is a graph illustrating the torque output variation amounts.

In FIGS. 14 and 15, A is a torque index sensor in which a shielding plate is installed, B is a torque index sensor without a shielding plate, and C is the torque index sensor according to the embodiment in which the second cover 900 made of a metal material is installed.

As shown in FIGS. 14 and 15, in the case of the torque index sensor B without the shielding plate, the torque output variation amount in a section in which an angle ranges from 40° to 160° is greatly reduced because a magnetic field interference occurs.

However, in the case of C in which the second cover 900 made of a metal material is installed, it can be confirmed that the torque output variation amount is detected like the case of A in which the shielding plate is installed. Accordingly, in the case of the torque index sensor according to the embodiment, it can be confirmed that the magnetic field interference is effectively shielded even without installing a separate shielding plate.

FIG. 16 is a view illustrating a torque index sensor according to a second embodiment, FIG. 17 is an exploded view of the torque index sensor shown in FIG. 16, and FIG. 18 is a side view of a circuit board shown in FIG. 17.

Referring to FIGS. 16 to 18, a torque index sensor 20 may include a rotor 1000, a stator 1200, a cover 1300, a circuit board 1400, a first Hall sensor 1500, a second Hall sensor 1600, a second magnet 1700, a magnet shield 1800, and a holder 1230.

The rotor 1000 is disposed in the stator 1200. The rotor 1000 is connected to an input shaft of a steering shaft. Here, the input shaft may be a steering shaft connected to a handle of a vehicle. The rotor 100 may include a cylindrical-shaped yoke 1110 and a first magnet 1120 disposed on the yoke 1110. The input shaft is inserted into the yoke 1110. Further, the first magnet 1120 may be disposed at the outside of the yoke 1110. The first magnet 1120 may be fixed to the outer circumferential surface of the yoke 1110 by adhesion or press-fitting.

The stator 1200 is disposed at the outside of the rotor 1000. The stator 1200 may include stator rings 1210, a molding member 1220, and the holder 1230. A pair of stator rings 1210 may be disposed to be spaced apart from and opposite to each other. Further, two stator rings 1210 may be fixed to an upper side and a lower side of the molding member 1220, respectively. The holder 1230 is coupled to the molding member 1220. The holder 1230 may be connected to an output shaft of the steering shaft. Here, the output shaft may be a steering shaft connected to a power transmission structure of the wheel side. Accordingly, the stator 1200 is connected to the output shaft and rotates together with the output shaft.

Meanwhile, the stator 1200 may be disposed adjacent to the stator rings 1210 and provided with a collector configured to collect a magnetization amount of the stator 1200

The cover 1300 may include a first cover 1310 and a second cover 1320. The first cover 1310 and the second cover 1320 may be disposed opposite to each other and each have a space to accommodate the stator 1200 therein. The circuit board 1400 is disposed between the first cover 1310 and the second cover 1320. The first cover 1310 may include a first hole 1311 through which the rotor 1000 passes. Further, the second cover 1320 may include a second hole 1321 through which the stator 1200 passes.

As shown in FIGS. 17 and 18, the first Hall sensor 1500 and the second Hall sensor 1600 are disposed on the circuit board 1400.

The circuit board 1400 may include a first surface 1410 facing the first cover 1310 and a second surface 1420 facing the second cover 1320. The first Hall sensor 1500 may be disposed on the first surface 1410. The second Hall sensor 1600 may be disposed on the second surface 1420.

The first Hall sensor 1500 detects the magnetization amount of the stator 1200 generated by an electric interaction between the first magnet 1120 of the rotor 1000 and the stator 1200. Specifically, the first Hall sensor 1500 is disposed between two collectors to detect the magnetization amount magnetized by an interaction between the stator rings 1210 and the first magnet 1120.

The rotor 1000, the stator 1200, and the first Hall sensor 1500 are configurations for measuring torque. Torsion occurs in a torsion bar between the input shaft and the output shaft due to a difference in the rotation amount between the input shaft and the output shaft. When the torsion occurs, a rotation amount of the first magnet 1120 of the rotor 1000 becomes different from a rotation amount of the stator 1200. Accordingly, since a facing surface of the first magnet 1120 becomes different from facing surfaces of the stator rings 1210, the magnetization amount varies. The first Hall sensor 1500 may detect variation of the magnetization amount to measure torque loaded to the steering shaft.

The second Hall sensor 1600 may output a detection signal with a period of 360° to calculate angle acceleration of the output shaft when a groove 1830 of the magnet shield 1800 and the second magnet 1700 are aligned.

The magnet shield 1800 is provided with a ring-shaped hole 1811 through which the stator 1200 passes.

FIG. 19 is a view illustrating the magnet shield shown in FIG. 17, and FIG. 20 is a view illustrating a location of each of the magnet shield and the second cover.

Referring to FIG. 19, the magnet shield 1800 may include an upper plate 1810 and a side plate 1820. The upper plate 1810 has a disk shape, and a hole 1811 through which the holder 1230 of the stator 1200 passes is disposed in a center of the upper plate 1810. The side plate 1820 is disposed along an edge of the upper plate 1810.

The side plate 1820 may include an outer side plate 1821 and an inner side plate 1822. The side plate 1821 is bent downward from an outer circumferential surface of the upper plate 1810. When the second cover 1320 is coupled to the first cover 1310, the outer side plate 1821 has a shape bent and configured to extend from the outer circumferential surface of the upper plate 1810 in an axial direction. The inner side plate 1822 is bent downward from an inner circumferential surface of the upper plate 1810.

The magnet shield 1800 is directly coupled to the holder 1230 of the stator 1200. Specifically, the holder 1230 of the stator 1200 is press-fitted into the hole 1811 of the upper plate 1810 to be coupled to the magnet shield 1800. In this case, the inner side plate 1822 guides so that the holder 1230 may be easily press-fitted into the hole 1811 of the upper plate 1810. Since the magnet shield 1800 and the holder 1230 are directly coupled to each other, when the holder 1230 rotates, the magnet shield 1800 immediately rotates. The outer side plate 1821 includes the groove 1830. The groove 1830 allows the inside and the outside of the outer side plate 1821 to communicate with each other.

Meanwhile, the magnet shield 1800 may be formed of a ferromagnetic material.

Referring to FIG. 20, the second cover 1320 may include a Hall sensor housing 1322 and a magnet housing 1323. The Hall sensor housing 1322 protrudes from an outer surface of the second cover 1320 and has a space in which the second Hall sensor 1600 is located. A front surface of the Hall sensor housing 1322, that is, a surface facing the second magnet 1700, may be open. The magnet housing 1323 protrudes from the outer surface of the second cover 1320 and includes the second magnet 1700 therein. The magnet housing 1323 may fix the second magnet 1700 so that a part of the second magnet 1700 may be exposed. The second magnet 1700 is fixed to the second cover 1320 through the magnet housing 1323 and does not move. The Hall sensor housing 1322 and the magnet housing 1323 are disposed to face each other.

FIG. 21 is a view illustrating a bottom surface of the magnet shield, and FIG. 22 is a view illustrating a second magnet and a second hall sensor on the basis of the second cove.

As shown in FIG. 21, an inner diameter R1 of the upper plate 1810 of the magnet shield 1800 may be the same as an outer diameter R2 of the holder 1230. The magnet shield 1800 is press-fitted into the holder 1230. Further, an outer diameter R3 of the upper plate 1810 may be greater than a distance L1 from a center C of the holder 1230 to the second magnet 1700 and less than a distance L2 from the center C of the holder 1230 to the second Hall sensor 1600. Accordingly, the side plate 1820 may be located between the second Hall sensor 1600 and the second magnet 1700 on the basis of a radial direction of the magnet shield 1800.

Meanwhile, a thickness of the outer side plate 1821 (t in FIG. 21) is formed to be less than a distance (d in FIG. 22) by which the second Hall sensor 1600 and the second magnet 1700 are spaced apart from each other. Accordingly, the outer side plate 1821 may pass between the second Hall sensor 1600 and the second magnet 1700 while the magnet shield 1800 rotates.

FIG. 23 is a view illustrating the second magnet and the second Hall sensor disposed to face each other.

Referring to FIGS. 22 and 23, the second Hall sensor 1600 and the second magnet 1700 are disposed to face each other. That is, the second Hall sensor 1600 and the second magnet 1700 may be disposed to be aligned on the basis of a circumferential direction of the magnet shield 1800. In this case, the second Hall sensor 1600 is disposed to face the outside of the outer side plate 1821 and the second magnet 1700 is disposed to face the inside of the outer side plate 1821. Accordingly, the outer side plate 1821 is disposed between the second Hall sensor 1600 and the second magnet 1700. Further, the groove 1830 disposed in the outer side plate 1821 is disposed between the second Hall sensor 1600 and the second magnet 1700. A width W of the second Hall sensor 1600 may correspond to a size of the groove 1830.

Meanwhile, the second magnet 1700 may include a first pole 1710 and a second pole 1720. The first pole 1710 may be an N-pole and the second pole 1720 may be an S-pole. The first pole 1710 may be relatively disposed outward from the second magnet 1700 and the second pole 1720 may be relatively disposed inward from the second magnet 1700. The first pole 1710 is disposed to face the second Hall sensor 1600.

The magnet shield 1800 rotates together as the holder (1230 in FIG. 17) rotates. In this case, the second magnet 1700 is in a fixed state. Accordingly, flux of the second magnet 1700 which causes a magnetic field interference at the first magnet 1120 and the first Hall sensor 1500 is not generated. Thus, a separate shielding plate configured to shield a magnetic field does not have to be installed. When a shielding plate is installed, an overall thickness of the torque index sensor is increased due to an installing space of the shielding plate, and since a shielding plate does not have to be installed in the torque index sensor according to the embodiment, there is an advantage that the overall thickness of the torque index sensor can be decreased.

FIG. 24 is a view illustrating a location of each of the rotating magnet shield and the groove and FIG. 25 is a view illustrating an output of the second Hall sensor.

FIG. 24A shows a state in which the outer side plate 1821 blocks the second Hall sensor 1600 and the second magnet 1700. In the state in FIG. 24A, as shown in FIG. 25, since an output is not generated from the second Hall sensor 1600, a signal is maintained in an off state. After that, when the magnet shield 1800 rotates in a clockwise direction CW, the groove 1830 disposed on the outer side plate 1821 also rotates in the clockwise direction CW. In the state in FIG. 24B, when the groove 1830 becomes close to the second Hall sensor 1600, the second magnet 1700 and the second Hall sensor 1600 communicate with each other, and accordingly, the output of the second Hall sensor 1600 is generated and the signal is converted to an on state. In addition, in states in FIGS. 24C and 24D, the output of the second Hall sensor 1600 is generated and the signal is maintained in an on state as rotation of the magnet shield 1800 continues and thus until the groove 1830 passes through the second Hall sensor 1600, that is, until the outer side plate 1821 completely covers the second Hall sensor 1600 and the second magnet 1700. In addition, when the rotation of the magnet shield 1800 is maintained and thus the outer side plate 1821 completely covers the second Hall sensor 1600 and the second magnet 1700, in the state in FIG. 24E, the output of the second Hall sensor 1600 is not generated and the signal is converted to an off state.

As described above, although an example in which the magnet shield 1800 rotates in the clockwise direction CW is described, even when the magnet shield 1800 rotates in a counterclockwise direction CCW, turning on or off of the signal corresponding to the output of the second Hall sensor 1600 may be converted according to a location of the groove 1830 of the outer side plate 1821.

As described above, the torque index sensor 20 according to the embodiment may generate an on or off signal according to a period in which the location of the groove 1830 disposed in the side plate 1820 of the magnet shield 1800 and the locations of the second Hall sensor 1600 and the second magnet 1700 are aligned in a state in which the second magnet 1700 does not rotate and is fixed. Accordingly, the flux may be generated by rotation of the second magnet 1700 and the magnetic field interference caused by the flux may be prevented.

The torque index sensor according to one embodiment of the present invention and the steering device including the same have been described in detail with reference to the accompanying drawings in the above.

The embodiment of the present invention should be considered to be exemplary and not limited, and the scope of the present invention will be shown by the appended claims rather than the above-described detailed description. Further, all changeable or modifiable shapes derived from meanings and scope of the claims and equivalents of the above should be considered to be within the scope of the present invention.

The invention claimed is:

1. A torque index sensor comprising:
a rotor having an outer circumferential surface on which a first magnet is disposed;
a stator disposed at the outside of the rotor;
a circuit board;
a first cover configured to accommodate the circuit board;
a first Hall sensor and a second Hall sensor mounted on the circuit board;
a magnet seating member coupled to the stator;
a second magnet coupled to the magnet seating member; and
a second cover made of a metal material and coupled to the first cover,
wherein the magnet seating member and the second magnet are disposed between the first cover and the second cover,
the second cover includes an upper plate in which a through hole is formed and a side plate configured to extend in a rotational axis direction from the upper plate,
the side plate includes a groove formed at a location corresponding to the second Hall sensor, and
the first Hall sensor is configured to sense a magnetic flux of the stator, and the second Hall sensor is configured to sense a magnetic flux of the second magnet.

2. The torque index sensor of claim 1, wherein:
the first cover includes a 1-1 cover and a 1-2 cover, the 1-1 cover includes a first hole through which the rotor passes, the 1-2 cover includes a second hole through which the stator passes, and the circuit board is disposed between the 1-1 cover and the 1-2 cover, and
the substrate includes a first surface facing the 1-1 cover and a second surface facing the 1-2 cover, the first Hall sensor is disposed on the first surface, and the second Hall sensor is disposed on the second surface.

3. The torque index sensor of claim 1, wherein the side plate is disposed between the second magnet and the second Hall sensor based on a direction perpendicular to an axial direction of the rotational axis.

4. The torque index sensor of claim 1, wherein:
the first cover includes a Hall sensor housing protruding from an outer surface of the first cover and in which the second Hall sensor is located,
the Hall sensor housing includes a slot accommodating the second Hall sensor,
the slot has an open surface, and
the slot includes a stopper protruding from an inlet of the open surface.

5. The torque index sensor of claim 1, wherein:
the first cover includes an accommodation part disposed on an outer surface thereof and concavely disposed along a circumference of the first hole through which the stator passes so that the magnet seating member is seated, and
the magnet seating member includes a first surface facing the second cover and a second surface facing the first cover, and the second magnet is disposed on the first surface.

6. The torque index sensor of claim 5, wherein the magnet seating member includes a first coupling part coupled to the stator in the direction perpendicular to the axial direction of the rotational axis.

7. The torque index sensor of claim 6, wherein the stator includes two stator rings and a molding member fixing the two stator rings, and the molding member includes a second coupling part coupled to the first coupling part.

8. The torque index sensor of claim 7, wherein:
the first coupling part includes at least one protrusion protruding from an inner circumferential surface of the magnet seating member, and the second coupling part includes a groove disposed in an outer circumferential surface of the stator holder and into which the first coupling part is inserted.

9. The torque index sensor of claim 1, wherein:
the first cover includes a Hall sensor housing protruding from an outer surface of the first cover and in which the second Hall sensor is located, and the groove of the side plate of the second cover and the Hall sensor housing are aligned based on a rotating direction of the rotational axis, and
an inner diameter of the side plate of the second cover is greater than an outer diameter of the magnet seating member.

10. The torque index sensor of claim 1, wherein the second cover includes a third coupling part, and the first cover includes a fourth coupling part coupled to the third coupling part,
the third coupling part includes an engaging flange protruding from the side plate and including an engaging hole, and
the fourth coupling part includes an engaging protrusion protruding from the first cover and inserted into the engaging hole.

11. A steering device comprising:
a steering shaft; and
a torque index sensor coupled to the steering shaft,
wherein the torque index sensor includes a rotor having an outer circumferential surface on which a first magnet is disposed, a stator disposed at an outside of the rotor, a circuit board, a first cover accommodating the circuit board, a first Hall sensor and a second Hall sensor mounted on the circuit board, a magnet seating member coupled to the stator, a second magnet coupled to the magnet seating member, and a second cover made of a metal material and coupled to the first cover, wherein the magnet seating member and the second magnet are disposed between the first cover and the second cover, the second cover includes an upper plate in which a through hole is formed and a side plate extending in a rotational axis direction from the upper plate, the side plate includes a groove formed at a location corresponding to the second Hall sensor, and the first Hall sensor is configured to sense a magnetic flux of the stator, and the second Hall sensor is configured to sense a magnetic flux of the second magnet.

12. A torque index sensor comprising:
a rotor having an outer circumferential surface on which a first magnet is disposed;
a stator disposed at the outside of the rotor;
a cover including a hole through which the stator passes;
a circuit board disposed at one side of the cover;
a first Hall sensor and a second Hall sensor mounted on the circuit board; and
a second magnet and a magnet shield disposed at the other side of the cover,
wherein the stator includes a holder coupled to a rotational axis,
the magnet shield is coupled to the holder,
the magnet shield includes an upper plate and a side plate configured to extend from the upper plate,
an inner diameter of the upper plate is the same as an outer diameter of the holder,
an outer diameter of the upper plate is greater than a distance from a center of the holder to the second magnet and less than a distance from the center of the holder to the second Hall sensor, and
the side plate has a groove formed in a size corresponding to a width of the second Hall sensor, and
wherein the first Hall sensor is configured to sense a magnetic flux of the stator, and the second Hall sensor is configured to sense a magnetic flux of the second magnet.

13. The torque index sensor of claim 12, wherein:
the second Hall sensor and the second magnet are disposed to face the side plate,
the second Hall sensor and the second magnet are aligned based on a circumferential direction of the magnet shield, and
the first Hall sensor and the second magnet are disposed to face each other.

14. The torque index sensor of claim 12, wherein:
the second magnet includes a first pole and a second pole; and
the first pole is disposed inward from the second magnet and the second pole is disposed outward from the second magnet based on a radial direction of the magnet shield.

15. The torque index sensor of claim 12, wherein:
the side plate of the magnet shield includes an outer side plate extending from an outer circumferential surface of the upper plate and an inner side plate extending from an inner circumferential surface of the upper plate, and
a thickness of the outer side plate is less than a spacing distance between the second Hall sensor and the second magnet.

16. The torque index sensor of claim 12, wherein:
based on a radial direction of the magnet shield, the second magnet is disposed in the side plate and the second Hall sensor is disposed at the outside of the side plate.

17. The torque index sensor of claim 12, wherein:
the torque index sensor includes a first cover including a first hole through which the rotor passes and a second cover including a second hole through which the stator passes.

18. The torque index sensor of claim 12, wherein:
the second cover includes a Hall sensor housing protruding from an outer surface thereof and in which the second Hall sensor is located.

19. The torque index sensor of claim 12, wherein:
the second cover includes a magnet housing protruding from an outer surface thereof to fix the second magnet.

20. A steering device comprising:
a steering shaft; and
a torque index sensor coupled to the steering shaft,
wherein the torque index sensor includes a rotor having an outer circumferential surface on which a first magnet is disposed, a stator disposed at the outside of the rotor, a cover including a hole through which the stator passes, a circuit board disposed at one side of the cover, a first Hall sensor and a second Hall sensor mounted on the circuit board, and a second magnet and a magnet shield disposed at the other side of the cover,
wherein the stator includes a holder coupled to a rotational axis,
the magnet shield is coupled to the holder,
the magnet shield includes an upper plate and a side plate extending from the upper plate,
an inner diameter of the upper plate is the same as an outer diameter of the holder,
an outer diameter of the upper plate is greater than a distance from a center of the holder to the second magnet and less than a distance from the center of the holder to the second Hall sensor,
the side plate has a groove formed in a size corresponding to a width of the second Hall sensor, and
wherein the first Hall sensor is configured to sense a magnetic flux of the stator, and the second Hall sensor is configured to sense a magnetic flux of the second magnet.

* * * * *